United States Patent [19]

Kudo et al.

[11] 4,262,063

[45] Apr. 14, 1981

[54] FUEL CELL USING ELECTROLYTE-SOLUBLE FUELS

[75] Inventors: Tetsuichi Kudo; Go Kikuchi; Hidehito Obayashi, all of Tokyo; Kohki Tamura, Hitachi, all of Japan

[73] Assignee: Hitachi, Ltd., Japan

[21] Appl. No.: 41,296

[22] Filed: May 22, 1979

[30] Foreign Application Priority Data

May 26, 1978 [JP] Japan .................. 53-62322

[51] Int. Cl.³ ............................................. H01M 8/00
[52] U.S. Cl. ......................................... 429/41; 429/42; 429/46
[58] Field of Search .................. 429/40–42, 429/44, 46, 15, 34, 27, 12

[56] References Cited

U.S. PATENT DOCUMENTS

| | | | |
|---|---|---|---|
| 3,276,909 | 10/1966 | Moos | 429/42 |
| 3,671,323 | 6/1972 | Sandler | 429/42 |
| 3,682,707 | 8/1972 | Sandler | 429/42 X |
| 3,778,311 | 12/1973 | Metzger et al. | 429/42 |
| 3,840,404 | 10/1974 | Porter et al. | 429/27 |
| 4,001,040 | 1/1977 | Fukuda et al. | 429/41 X |

FOREIGN PATENT DOCUMENTS 38-23817  11/1963  Japan .

*Primary Examiner*—Anthony Skapars
*Attorney, Agent, or Firm*—Craig & Antonelli

[57] ABSTRACT

A fuel cell using an electrolyte-soluble fuel in which a solid film exhibiting a hydrogen ion- and/or hydronium ion-conducitivty is provided on the surface of an air electrode close to an electrolyte containing the fuel is disclosed.

The solid film transmits hydrogen ions and hydronium ions, but it does not transmit water and oxygen in substance. Therefore, the leakage of electrolyte and the variation of the composition ratio of the electrolyte are not feared, so that the fuel cell can be used for a long time.

6 Claims, 4 Drawing Figures

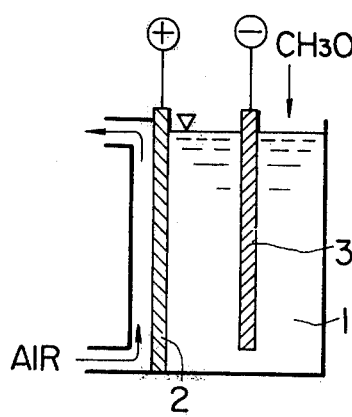
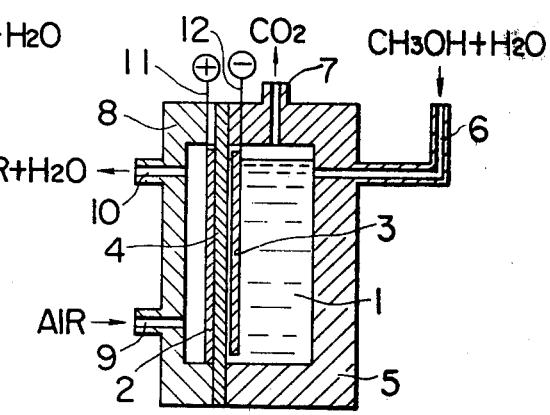
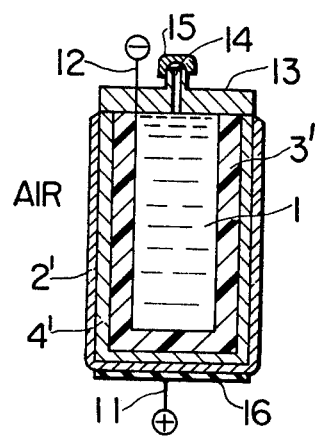
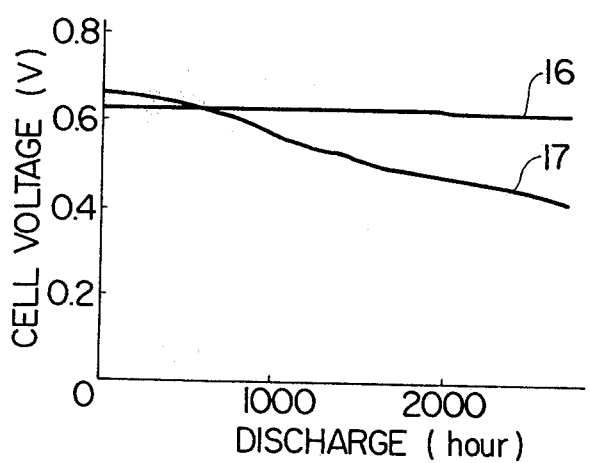

FUEL CELL USING ELECTROLYTE-SOLUBLE FUELS

BACKGROUND OF THE INVENTION

1. Field of the Invention

This invention relates to a fuel cell, and more particularly to an electrolyte-soluble fuel cell which employs, for example, methanol or formaldehyde as a fuel.

2. Description of the Prior Art

FIG. 1 is a schematic view in which the structure of a prior-art fuel cell employing an electrolyte-soluble fuel is shown. As apparent from FIG. 1, the prior-art fuel cell of the electrolyte-soluble fuel type has a structure in which an air electrode 2 (positive electrode) formed of a porous material such as carbon serves also as a partition wall between an electrolyte 1 with the fuel dissolved therein (hereinbelow, written "anolyte") and the air (although the air is the most suitable in practical use, any gas containing oxygen may be employed besides the air). Numeral 3 designates a negative electrode.

This structure has the disadvantage that, as the fuel cell is continued to be used, the anolyte 1 gradually leaks out through the pores of the air electrode 2.

In the prior-art fuel cell employing the electrolyte-soluble fuel, and electromotive reaction takes place at a gaseous phase interface in the electrode 2. In consequence, part of the water produced by the electromotive reaction is emitted onto the air side in the form of water vapor. The greater part of the water, however, enters the anolyte 1 and lowers the concentration of the anolyte 1. Therefore, the ratios of the components (water, electrolyte and fuel) of the anolyte vary with the use in a complicated manner. In order to keep them constant, the water must be removed while measuring the composition ratios of the anolyte. This requires an extremely intricate operation.

Moreover, since the air and the anolyte come into contact, oxygen in the air oxidizes the fuel in the anolyte by the air electrode catalysis in a non-electrochemical manner. As a result, the utilization factor of the fuel is reduced.

There has been proposed a fuel cell in which, to the end of preventing the liquid leakage from the air electrode, an oxygen transmitting film made of, for example, polyethylene is arranged outside the air electrode (on the air side) or in the air electrode (Japanese Patent Application Publication Nos. 26896/1973 and 12773/1971).

However, the oxygen-transmitting films of polyethylene, etc. presently known exhibit low transmission factors for oxygen and cannot supply a sufficient quantity of oxygen to the surface of the air electrode. Accordingly, the fuel cell employing such a film is difficult to provide a satisfactorily high output. On account of the direct contact between the oxygen and the anolyte, the concentration of the anolyte is lowered by the produced water as described above, and besides, the anolyte is oxidized, the composition of the anolyte varying also due to this effect.

SUMMARY OF THE INVENTION

An object of this invention is to solve the problems of the prior-art fuel cells employing electrolyte-soluble fuels, and to provide a fuel cell employing an electrolyte-soluble fuel and a liquid electrolyte which cell is free from the leakage of the electrolyte and in which the adjustment of the composition of the electrolyte-fuel mixture is very easy.

In order to accomplish the object, according to this invention, a solid film which has a proton ($H^+$) and/or hydronium ion ($H_3O^+$) transmissivity or permeability, that is a solid film through which hydrogen ions and/or hydronium ions can pass but anions and water cannot pass, in effect is held in close contact with the electrolyte side of an air electrode.

BRIEF DESCRIPTION OF THE DRAWINGS

FIG. 1 is a schematic view which shows the structure of a prior-art fuel cell employing an electrolyte-soluble fuel;

FIGS. 2 and 3 are sectional views which show different embodiments of this invention, respectively; and FIG. 4 is a graph in which the characteristics of fuel cells in this invention and a prior art are compared.

DETAILED DESCRIPTION

FIG. 2 is a view which shows the sectional structure of an embodiment of the fuel cell of this invention.

As apparent from FIG. 2, in this invention, a solid film 4 is arranged in close contact with the electrolyte and fuel mixture 1 side (i.e. liquid side) of an air positive electrode 2, and a negative electrode 3 is positioned opposite to the solid film 4 with a slight spacing therebetween. Needless to say, the negative electrode 3 may well be in contact with the solid film 4. It is also allowed to separate the negative electrode 3 more and to make the spacing from the negative electrode to the film 4 larger. However, in order to reduce to the utmost the voltage loss in flowing across the electrolyte-fuel mixture 1, it is desirable that the distance between both the electrodes 3 and film 4 is small.

As is well known, the electrode reactions in a fuel cell are expressed by the following formulae when a case of using methanol as fuel is exemplified:

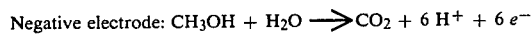
Negative electrode: $CH_3OH + H_2O \longrightarrow CO_2 + 6H^+ + 6e^-$

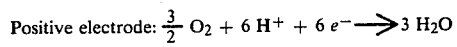
Positive electrode: $\frac{3}{2} O_2 + 6H^+ + 6e^- \longrightarrow 3H_2O$ Since the solid film 4 used in this invention has proton- and hydronium ion-permeability as stated previously, hydrogen ions generated at the negative electrode 3 in accordance with Formula (1) pass through the solid film 4 and reach the positive electrode 2.

Electrons ($e^-$) simultaneously generated at the negative electrode 3 pass to the positive electrode 2 via an external circuit (not shown) which connects the positive electrode 2 and the negative electrode 3. In consequence, both the hydrogen ions and the electrons react with oxygen in the air to give rise to the positive electrode reaction indicated in Formula (a). As a result of the reactions indicated in Formulae (1) and (2), a chemical reaction according to the following formula (3) proceeds:

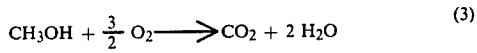
$$CH_3OH + \frac{3}{2} O_2 \longrightarrow CO_2 + 2H_2O \quad (3)$$

The fuel cell according to this invention has the structure as described above, and therefore has the ensuing features:

(1) The solid film 4 transmits $H^+$ or $H_3O^+$ corresponding to the value of a current to be taken out to the external circuit, but it allows the transmission of no water molecules ($H_2O$) or only very slight amount of the water molecules. Therefore, the electrolyte scarcely leaks from its enclosure, and the leakage-proof characteristic of the fuel cell of this invention is rapidly enhanced as compared with that of the prior-art fuel cell.

(2) Almost all the water produced at the interface between the air electrode 2 and the solid film 4 by the electromotive reaction is emitted onto the air side and does not enter the electrolyte-fuel mixture 1, so that the concentration of the mixture 1 is not lowered.

(3) Based on the substantially reduced leakage described in Item (1), the proceeding of the so-called wetting phenomenon of the air electrode 2 becomes conspicuously slow, and the lifetime of the cell lengthens.

(4) Since the air electrode is supported by the solid film, the fuel cell is easy in manufacture and is suited for mass production.

(5) Since the air and the electrolyte-fuel mixture do not come into direct contact, the non-electrochemical oxidation of fuel in the electrolyte-fuel mixture by oxygen in the air does not take place, and the utilization factor of the fuel is great.

As described above, the solid film for use in this invention has the property that it transmits $H^+$ or $H_3O^+$ but it does not transmit any appreciable amount of water molecules. There are many kinds of films having this property.

As organic high-polymer films, there can be used a graft polymer of polystyrene and polyethylene into which a suitable amount of sulfonic groups ($5 \times 10^{-4} - 2 \times 10^{-3}$ equivalent/g. polymer) are introduced and a large number of other organic high-polymer films, such as "Nafion" (a trade name of a perfluorosulfonic acid membrane produced by Du Pont Inc. in the U.S.A.), which contain proton-philic groups (sulfonic groups, etc.). "Nafion 427" contains 1200 equivalent of $SO_3^-$/g. polymer.

Besides the organic high-polymer films, there can be employed a sintered structure or molded structure which is obtained in such a way that at least one inorganic compound having a hydrogen bond structure with many defects, for example, bamite (Al00H), hetero-phosphomolybdate or zirconium phosphate is pressed and molded into a thin sheet, or a composite molded compact structure which is made up of such an inorganic compound and a high polymer material.

Among these solid films, ones of various organic high-polymer compounds which are doped with hydrophillic ion groups such as sulfonic groups, carboxyl groups and phosphoric groups are the most preferably in practical use.

As the fuels, a large number of substances (initial concentration is 1~10 mol/l) which include alcohols such as methanol and ethanol, and further hydrogen, formic acid, formalin, etc. can, of course, be used as in the conventional fuel cells. Suitable electrolytes include water with inorganic acids such as sulfuric acid and phosphoric acid or organic acids such as trifluoromethane sulfonic acid.

EXAMPLE 1

One gram of platinum black was added to 2.5 ml of a suspension of polytetrafluoroethylene (content: 0.4 gr/ml), and these materials were admixed well, to form a pasty mixture consisting of platinum black and polytetrafluoroethylene. This pasty mixture was applied onto a platinum net of 100 mesh size at a surface density of 25 mg/cm², whereupon the net was heat-treated in a nitrogen atmosphere at 250° C. for 30 minutes so as to sinter the polytetrafluoroethylene. The sintered compact was used as a positive electrode (air electrode).

The positive electrode thus obtained was placed on a film (0.25 mm thick) of an organic high-polymer compound (trade name "Nafion", produced by DuPont Inc. in the U.S.A.) the structural formula of which is indicated by:

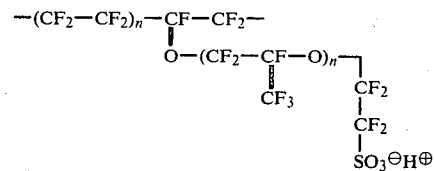

By applying a pressure of 8 tons/cm², the positive electrode and the "Nafion" film were brought into pressed contact and were made integral.

On the other hand, a carbon plate having a porosity of about 60% was impregnated with an aqueous solution of chloroplatinic acid at a concentration of 1%, and it was heat-treated at 600° C. in a nitrogen atmosphere, whereby a negative electrode was formed. Since chloroplatinic acid is decomposed at 600° C., platinum is formed on the pores of the carbon plate by the aforecited heat treatment, and it acts as an electro-oxidizing catalyst of fuel such as methanol.

Using these constituents, a cell having a sectional structure as shown in FIG. 2 was formed. Referring to FIG. 2, numeral 1 designates an electrolyte-fuel mixture that is a mixed solution in which the weight ratio of phosphoric acid, methanol and water is 1:1:2. The phosphoric acid can be replaced with such acids as sulfuric acid and trifluoromethane sulfonic acid.

Numeral 2 indicates a positive electrode (air electrode), numeral 4 a "Nafion" film made integral with the positive electrode 2, numeral 3, a negative electrode and numeral 5, a container for defining the cell.

Since methanol and water are consumed by the negative electrode 3, they are replenished from an inlet 6 to prevent the decrease thereof. Carbon dioxide gas produced by the oxidation of the methanol is emitted from an exhaust port 7 to the exterior.

Air enters an air chamber from an air feed port 9 which is provided in an air chamber frame 8. Part of oxygen in the air is consumed at the positive electrode 2, and the air left behind is emitted from a gas outlet 10 to the exterior along with water vapor produced.

Numerals 11 and 12 indicate the positive electrode and the negative electrode terminals, respectively.

The relationship between the terminal voltage and the discharge time at 25° C. and 20 mA/cm², of the methanol-air fuel cell thus formed is illustrated in FIG. 4.

In FIG. 4, a curve 17 corresponds to a prior-art methanol-air fuel cell, that is, the cell of the structure in which the solid film is removed from the structure of the cell shown in FIG. 2. A curve 16 corresponds to the cell according to this invention.

As apparent from FIG. 4, with the cell of the prior-art structure, the terminal voltage lowered gradually as the discharge was continued; whereas in case of the cell according to this invention, the terminal voltage did not lower even when the discharge was continued longer than 2,000 hours.

In the case of the cell according to this invention, the discharge could be continued without hindrance in such a way that a fuel solution in which the weight ratio of water and methanol was 9:16 was added to the anolyte once in 24 hours. In the case of the prior-art cell, however, the anolyte, i.e. the electrolyte-fuel mixture contacting the positive electrolyte, was diluted by water produced with the discharge, so that the anolyte needed to be replaced with new anolyte once in 24 hours. In other words, with the prior-art cell, the proportions of the acid, methanol and water could not be held constant merely by replenishing the methanol or a mixed solution consisting of methanol and water, and the anolyte had to be exchanged. Also in this respect, it is obvious that the invention provides excellent results.

EXAMPLE 2

FIG. 3 is a view showing another embodiment of this invention which is a closed type fuel cell.

A positive electrode 2' contacts with air in a large area on the outermost side. A solid film 4' is arranged in close contact with the inner side of the positive electrode 2', and a negative electrode 3' is arranged with a narrow interspace between this negative electrode and the solid film 4' (needless to say, an electrolyte-fuel mixture 1 is received in the interspace).

All of the positive electrode 2', the solid film 4', the negative electrode 3' and the electrolyte-fuel mixture 1 are made of the same materials or compositions as in Example 1.

An upper lid 13 is provided with a fuel inlet 14 which serves also as a carbon dioxide gas-exhaust port, and on which a cap 15 made of a silicon resin is placed. Although the silicon resin does not transmit liquid, it transmits the carbon dioxide gas. Therefore, the carbon dioxide generated during the discharge reaction is emitted to the exterior without hindrance. Shown at 16 is a metal plate for collecting current.

In case of this example, the forced circulation of air was not carried out, and the natural diffusion was resorted to. When the relationship between the discharge time and the terminal voltage was measured at a current density of 20 mA/cm$^2$, substantially the same result as in Example 1 was obtained.

For the convenience of the description, the cases where the solid film and the negative electrode are constructed in the spaced manner have been exemplified. It is a matter of course, however, that even when the solid film and the negative electrode are held in close contact, quite no hindrance occurs because the solid film in this invention permits hydrogen ions and hydronium ions to permeate therethrough but does not permit electrons to permeate therethrough as stated above.

As understood from the above description, according to this invention, the leakage of the liquid electrolyte-fuel mixture can be perfectly prevented by the solid film, the fuel cell can be used continuously for a long time without the lowering of the terminal voltage, and the liquid mixture need not be exchanged and can be kept at an appropriate concentration merely by replenishing fuel and water. The fuel cell of this invention has such far more excellent properties as compared with the prior-art fuel cells.

What is claimed is:

1. A fuel cell using an electrolyte-soluble fuel, comprising a positive electrode having at least two major surfaces, with at least one major surface that is in direct contact with a gas-containing oxygen, a negative electrode which is arranged in opposition to another major surface of said positive electrode, a hydrogen ion- and/or hydronium ion-conductive solid film being provided on and in close contact with said another major surface of said positive electrode and means defining a container for a liquid comprised of an aqueous electrolyte and an electrolyte-soluble fuel, said liquid being in contact with said negative electrode and said solid film, and said film preventing transmission of water, thereby preventing contact between water formed at the positive electrode and said liquid and also preventing leakage of liquid from said container.

2. A fuel cell using an electrolyte-soluble fuel according to claim 1, wherein said solid film is a film of an organic high-polymer compound which has protonphilic groups.

3. A fuel cell using an electrolyte-soluble fuel according to claim 1, wherein said solid film is a compact structure of at least one inorganic compound which has a hydrogen bond structure with a large number of defects.

4. A fuel cell using an electrolyte-soluble fuel according to claim 1, wherein the liquid contains methanol, an acid, and water.

5. A fuel cell using an electrolyte-soluble fuel according to claim 1, wherein said negative electrode is a porous carbon plate in which platinum is bonded.

6. A fuel cell using an electrolyte-soluble fuel according to claim 1, wherein said positive electrode is a mixed cemented compact structure of polytetrafluoroethylene and a platinum catalyst.

* * * * *